(12) United States Patent
May et al.

(10) Patent No.: US 8,262,153 B2
(45) Date of Patent: Sep. 11, 2012

(54) VEHICLE PILLAR WITH OPENING HAVING ANGLED FLANGE

(75) Inventors: Christopher John May, Novi, MI (US); Darrin Neil Wagner, Bloomfield Hills, MI (US); Rabin Bhojan, Northville, MI (US); Dan O. Dague, Newport, MI (US); John A. Speirs, West Bloomfield, MI (US); Dennis P. Laakso, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/974,541

(22) Filed: Dec. 21, 2010

(65) Prior Publication Data

US 2012/0153680 A1   Jun. 21, 2012

(51) Int. Cl.
*B60J 7/00* (2006.01)

(52) U.S. Cl. .......... 296/193.06; 296/187.12; 296/193.05
(58) Field of Classification Search ............. 296/193.06, 296/187.12
See application file for complete search history.

(56) References Cited

U.S. PATENT DOCUMENTS

| | | | |
|---|---|---|---|
| 4,312,521 A | 1/1982 | Thomas et al. | 280/806 |
| 4,549,749 A | 10/1985 | Thomas | 280/808 |
| 4,971,357 A | 11/1990 | Nakasaki et al. | 280/801 |
| 5,069,483 A | 12/1991 | Hirasawa | 280/801 |
| 6,428,080 B1 * | 8/2002 | Ochoa | 296/146.6 |
| 6,810,707 B2 | 11/2004 | Friedman et al. | 72/220 |
| 7,581,782 B2 | 9/2009 | Tomozawa | 296/187.12 |
| 2010/0244492 A1 * | 9/2010 | Itakura | 296/193.06 |

* cited by examiner

*Primary Examiner* — Joseph Pape
(74) *Attorney, Agent, or Firm* — L. C. Begin & Associates, PLLC

(57) ABSTRACT

A panel incorporated into a pillar of a vehicle body includes a base portion defining an opening, and a flange extending from an edge of the opening such that a portion of the flange forms an acute angle with the base portion.

20 Claims, 4 Drawing Sheets

VEHICLE PILLAR WITH OPENING HAVING ANGLED FLANGE

BACKGROUND OF THE INVENTION

Seat belt retractors are generally mounted within bodyside pillars of a vehicle, for example, inside an enclosure formed within a vehicle pillar. To connect a seat belt residing in an interior of the vehicle with the retractor mounted inside the pillar, an opening is provided in the pillar. Newer seat belt retractor designs are much larger than previous designs, in order to accommodate enhanced protective features such as adaptive pretensioners and load management features. These newer retractors may require relatively larger openings in the "B" pillar to install the retractor, resulting in a reduction in the cross-sectional area of the portion of the pillar incorporating the opening. Thus, during roof crush and side impact events, relatively greater stresses are produced in the portion of the pillar having the reduced cross-sectional area.

To address this problem, a separately formed reinforcement ring is attached to an edge of the opening in some vehicle designs in order to structurally reinforce the reduced cross-section. However, due to the increased size of the new seatbelt retractors, there is often insufficient package space to efficiently and securely weld additional reinforcement rings around the opening. Also, inclusion of the reinforcement ring and installation of the ring in the restricted space described above increases the piece part and assembly costs of the pillar assembly. Thus, a need exists for a method of reinforcing the cross section of a pillar assembly in the region of a retractor opening incorporated into the pillar.

SUMMARY OF THE INVENTION

In one aspect of the embodiments of the present invention, a panel for a vehicle pillar is provided. The panel includes a base portion defining an opening, and a flange extending from an edge of the opening such that a portion of the flange forms an acute angle with the base portion.

In another aspect of the embodiments of the present invention, a vehicle pillar structure is provided. The pillar defines an enclosure therein and includes a base portion defining at least a portion of the enclosure, and a flange extending from the base portion into the enclosure so as to form an acute angle with the base portion.

DETAILED DESCRIPTION

As used herein, the term "front" denotes a position at or a direction toward a front or forward portion of the vehicle. The term "rear" denotes a position at of a direction toward a rear portion of the vehicle. The term "upper" denotes a vertically upward position or direction with respect to a ground on which the vehicle rests. Also, the term "lower" denotes a vertically downward position or direction with respect to the ground on which the vehicle rests, and the terms "left" and "right" denote lateral directions extending perpendicularly with respect to a fore-aft axis of the vehicle (i.e., directions to the left and right of a driver or passenger sitting in the vehicle and facing toward the front of the vehicle).

FIGS. 1-6 show a portion of a vehicle body 10 incorporating a pillar structure 12 in accordance with one embodiment of the present invention. As the vehicle body structure is substantially symmetrical with respect to a plane bisecting the vehicle along its length, only the pertinent elements along one side of the vehicle body will be described.

Figure 1:
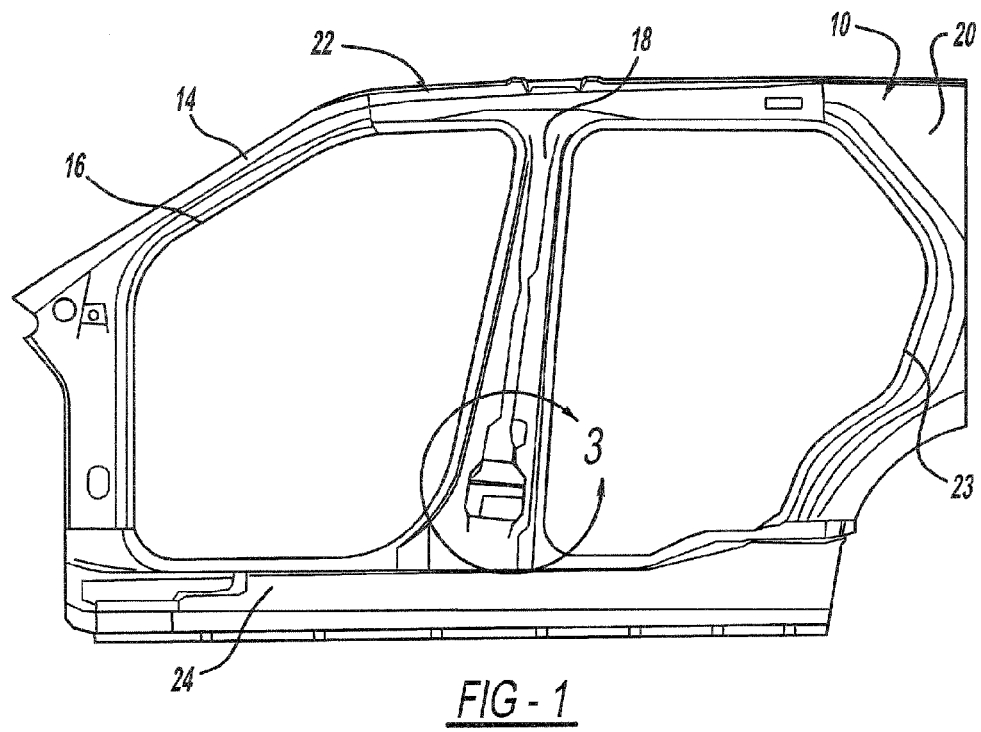
FIG. 1 is a cross-sectional side view of a portion of a vehicle body incorporating a pillar structure in accordance with one embodiment of the present invention.
Figure 2:
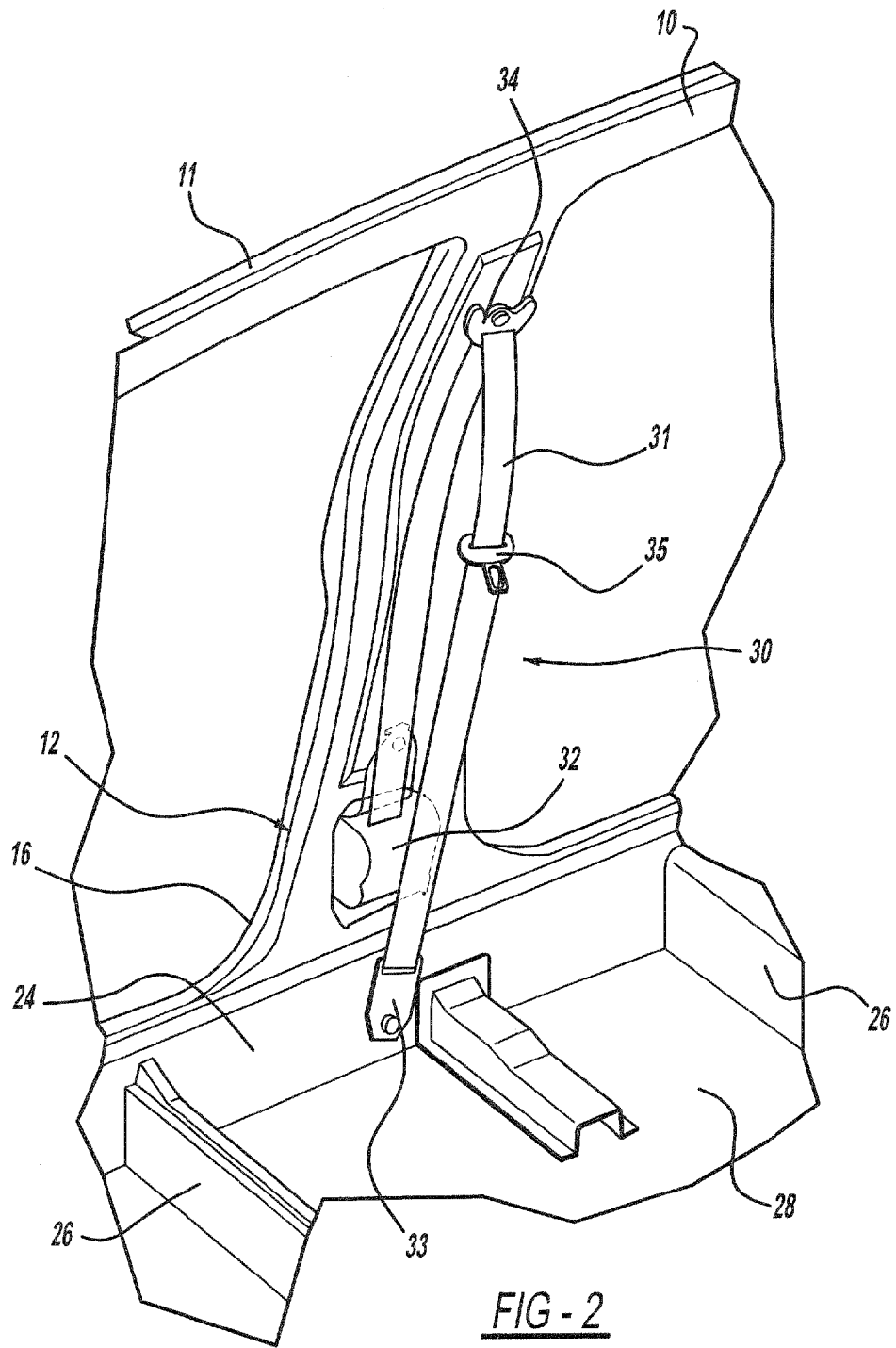
FIG. 2 is a perspective view of a portion of the vehicle body shown in FIG. 1 showing a portion of the vehicle interior.

As shown in FIGS. 1 and 2, the vehicle body 10 includes a side portion 12. The vehicle body side portion 12 includes a front or "A" pillar 14 disposed along a front side of a door opening 16, a center or "B" pillar 18 extending along a rear side of the door opening 16, and a rear or pillar 20 extending along a rear side of a rear passenger compartment opening 23 of the vehicle. Doors (not shown) are attached to the vehicle body for opening and closing the door openings 16 and 23.

A side frame 22 extends along an upper side of the door opening 16, and a side sill 24 extends along a lower side of the door opening 16 in a front-rear direction of the vehicle. The body structure may also include one or more stiffening brackets or members 26 connected to side sill 24 by welding or any other suitable method. One or more vehicle floor panels 28 extend between the brackets 26. In addition, other cross-members or stiffening members (not shown) may connect opposed side sills 24 and other portions of the vehicle for providing strength and rigidity to the vehicle frame, in a manner known in the art. The side frame 22 is disposed generally orthogonally to an upper end portion of the "B" pillar 18 for supporting the vehicle roof. The side frame 22 forms an upper periphery of the door opening 16. The side frame 22 may be formed in a known manner from any suitable material or materials, for example metallic materials and/or polymeric materials.

As shown in FIGS. 1 and 2, the side sill 24 is disposed generally orthogonally and is connected to a lower end portion of the pillar 18 to support, for example, the various stiffening brackets 26 and floor panel 28. The side sill 24 extends generally along the front-rear direction of the vehicle. The side sill 24 may be formed in a known manner from any suitable material or materials, for example metallic materials and/or polymeric materials.

In the following discussion, embodiments of the pillar flanges 42, 142 of the present invention will be described as incorporated into pillar 18. However, a pillar structure and elements thereof in accordance with embodiments of the present invention may be incorporated into any pillar or roof-supporting feature into which a mechanism requiring access to the vehicle interior (such as a seatbelt retractor mechanism, for example) is to be mounted. In addition, a flanged pillar structure in accordance with embodiments described herein may be incorporated into any type of vehicle, for example, a passenger car, truck, or service vehicle.

Also, in the following discussion, the general shapes and dimensions of the cross-sections of the flanges extending along opposite sides of opening 36a are substantially the same, and the elements of the flange cross-sections have been given similar element numbers. However, in other embodiments, a flange formed along one side of the edge of opening 36a may have a different shape and different dimensions than a flange formed along an opposite side of the edge of opening 36a.

As seen in FIGS. 1-6, "B" pillar 18 extends along a generally vertical axis between side frame 22 and side sill 24. In the embodiment shown in FIGS. 1-6, pillar "B" is formed by an outer panel 34 and an inner panel 36 coupled to the outer panel to form a hollow enclosure 90. Inner panel 36 may be coupled to outer panel 34 using any suitable method, such as welding or fasteners. A surface of outer panel 34 may form an exterior surface of the vehicle. Inner panel 36 and outer panel 34 may be formed from metal stampings, for example.

A mechanism 32 is received and secured within enclosure 90. An opening 36a is formed in inner panel 36 to enable communication between enclosure 90 and an interior of the vehicle, thus permitting mechanism 32 to interact with elements in the vehicle interior. In the embodiment described herein, mechanism 32 is a seatbelt retractor mechanism; however, any other desired mechanism may be positioned and secured in enclosure 90.

Seat belt retractor 32 is mounted in vehicle body 12 for winding up a seat belt 31 of a seat belt unit 30, which is used for securing drivers and passengers in their respective seats. Retractor 32 may be mounted within a lower portion of an enclosure 90 defined by the "B" pillar 18 (as described below). Retractor 32 may be secured within enclosure 90 using any of a variety of known methods.

As shown in FIG. 2, a seat belt unit 30 is used for securing a body of a passenger to a seat (not shown) by a seat belt 31. The seat belt unit 30 includes the seat belt 31, retractor 32 for winding up one end of the seat belt 31, a first anchor 33 for fixing the other end of the seat belt 31 to the vehicle body 12, a second anchor 34 which is connected to an upper portion of the "B" pillar 18 and through which the seal belt 31 passes, a tongue 35 which is arranged between the second anchor 34 and the first anchor 33 and through which the seat belt 31 passes, and a buckle (not shown) into which the tongue 35 is inserted and secured to secure the passenger.

Figure 4:
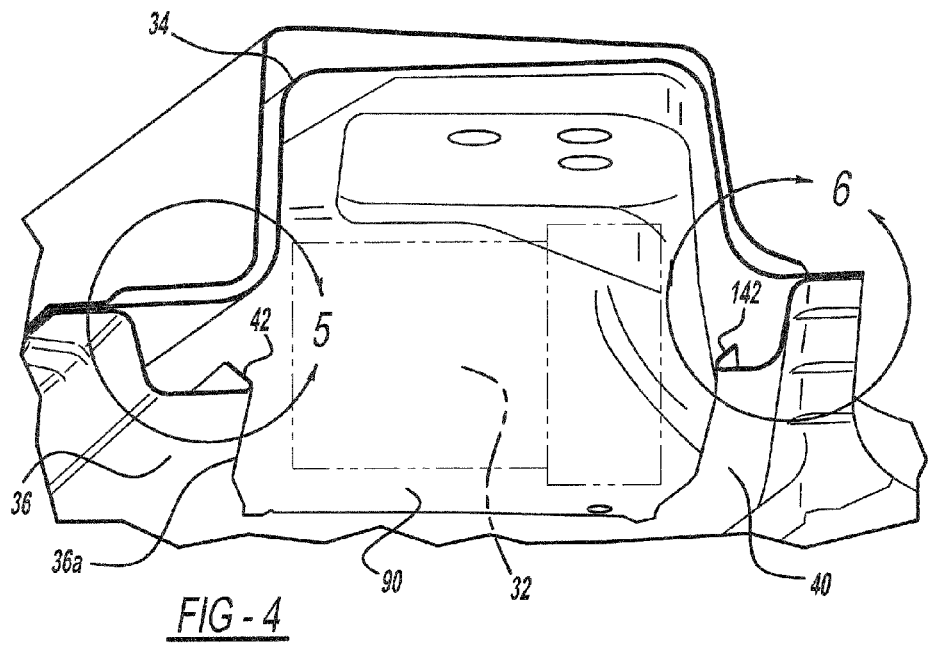
FIG. 4 is a cross-sectional view of the portion of the "B" pillar shown in FIG. 3.
Figure 5:
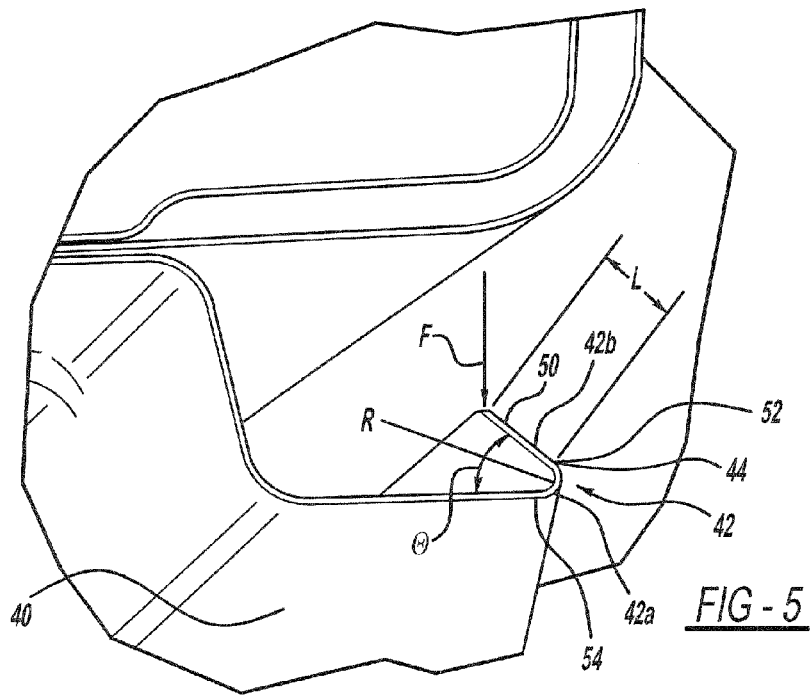
FIG. 5 is a magnified view of a first portion of the cross-section shown in FIG. 4.
Figure 6:
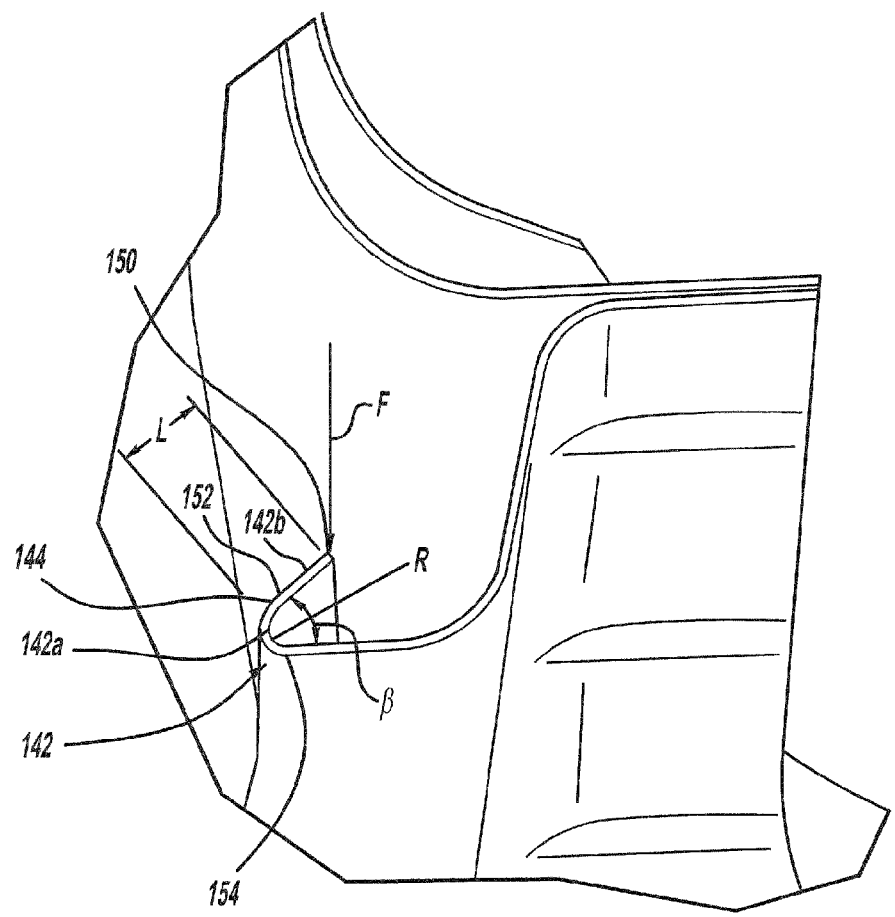
FIG. 6 is a magnified view of a second portion of the cross-section shown in FIG. 4.

FIGS. 4-6 show cross-sectional views of portions of the inner panel opening 36a. Referring to FIGS. 4-6, the edge portions of the inner panel opening 36a each have a flange 42, 142 extending from a first, common base portion 40. In the manner described below, flange 42, 142 extend from the base portion 40 into the enclosure 90 so as to form an acute angle with the base portion.

Flanges 42, 142 include respective curved second portions 42a, 142a extending from one or more edges of opening 36a, and third portions 42b, 142b extending from respective ends 44, 144 of second portions 42a, 142a. Second portions 42a, 142a curve from base portion 40 toward enclosure 90, to respective ends 44, 144 of the second portions. Second portions 42a, 142a may have substantially constant radii of curvature R, or the radii of curvature may vary along the lengths of the second portions, depending on the requirements of a particular application. The second portions 42a, 142a may extend for any desired arc lengths, depending on such factors as the desired angle between base portion 40 and third portions 42h, 142b and other pertinent factors. In one particular embodiment, the second portions 42a, 142a are semi-circular and have a radius R in the range of about 16 millimeters to about 20 millimeters. However, the radius may have any suitable value.

In the embodiment shown in FIGS. 4-6, third portions 42b, 142b extend from ends 44, 144 of second portions 42a, 142a, respectively. In the embodiment shown, third portions 42b, 142b are substantially straight; however, the third portions may have any desired cross-sectional shapes.

In the embodiments shown herein, third portions 42b, 142b form acute angles θ and β with base portion 40. Each of angles θ and β may be defined by the intersection of a plane extending along a respective one of third portions 42b, 142b, and a plane extending along or parallel to the part of the base portion 40 to which a respective one of second portions 42a, 142a is attached. In a particular embodiment, third portions 42, 142 form an acute angle with a plane extending parallel to a fore-aft axis of the vehicle.

In one embodiment, the angles θ and β between the third portions 42h, 142b and base portion 40 are in the range of 35 degrees to 55 degrees. In one particular embodiment, the angles θ and β are each about 45 degrees.

In alternative embodiments, the base portion from which the flanges project may be formed by a portion of the pillar other than an inner panel of the pillar.

Referring to FIGS. 5 and 6, second and third portions 42a, 142a and 42b, 142b act to absorb energy due to lateral vehicle loads applied in the general direction of arrow F. Such loading may result, for example, from an impact on the side of the vehicle which pushes outer panel 34 and/or an element positioned within enclosure 90 toward the vehicle interior, causing the outer panel or the element in the enclosure to contact the inner panel flanges 42, 142. As the responses of flanges 42 to a laterally-acting force (due to, for example, a side-impact on the vehicle) will be substantially the same, only the deflection of flange 42 (FIG. 5) responsive to a side-impact force will be discussed. It is understood that the description of the response to a laterally-acting force will apply equally to both of flanges 42 and 142.

When a laterally-acting force "F" is applied to third portion 42b, the third portion deflects in the general direction of application of the force. Depending upon the amount by which third portion 42b deflects, movement of third portion 42b may cause a rotation of third portion free end 50 with respect to a third portion end 52 extending from second portion end 44, and also with respect to second portion end 44 to which third portion 42b is attached. Movement of third portion 42b may also cause second portion end 44 to deflect or coil inward with respect to second portion end 54 and with respect to base portion 40, from which the second portion end 54 extends. Thus, a portion of the side impact energy is dissipated in deforming the second and third portions 42a and 42b of the inner panel which project into enclosure 90. In this respect, the flange structure comprising second portion 42a and third portion 42b is capable of absorbing impact energy by elastically or plastically deforming responsive to the applied load. The second and third portions effectively act as spring portions for absorbing at least a portion of the impact energy. In a particular embodiment, second portion 42a is resiliently deflectable with respect to base portion 40 responsive to the force applied to the third portion 42b. In a particular embodiment, the third portion 42b is resiliently deflectable with respect to the second portion 42a responsive to the applied force.

The cross-sectional configuration just described is designed to maximize energy absorption per unit deflection of the second and third inner panel portions 42a, 142a and 42b, 142b, thereby optimizing use of the limited space available for incorporating an energy-absorbing structure between the inner and outer pillar panels. This configuration is also directed to maximizing the amount the inner panel portions can deflect prior to plastic deformation of the inner panel base portion, and also aids in resisting tearing of the inner panel during side impacts. The flange configuration also stiffens the cross-section against buckling due to roof crush loading caused by, for example, a vehicle rollover event.

In the manner described above, structural reinforcement of the reduced inner panel cross-section is achieved without the use of a separate reinforcing member. This reduces the panel assembly piece part cost and assembly cost.

In another embodiment, a third, curved portion may be formed at each of free ends 50, 150 to aid in preventing catching or binding between the free ends and an object engaging and pressing on the free ends in the direction of arrows "F".

The radii of second portions 42a, 142a, the lengths of third portions 42b, 142b, the angles θ and β formed between the third portions 42b, 142b, and the base portion 40, and other pertinent parameters may be optimized in a known manner to maximize the side-impact energy absorption of the second and third portions for a given available space between the inner and outer pillar panels. In one embodiment, one or more of third portions 42b, 142b are substantially straight and have lengths L in the range of about 7 millimeters to about 11 millimeters, inclusive.

Figure 3:
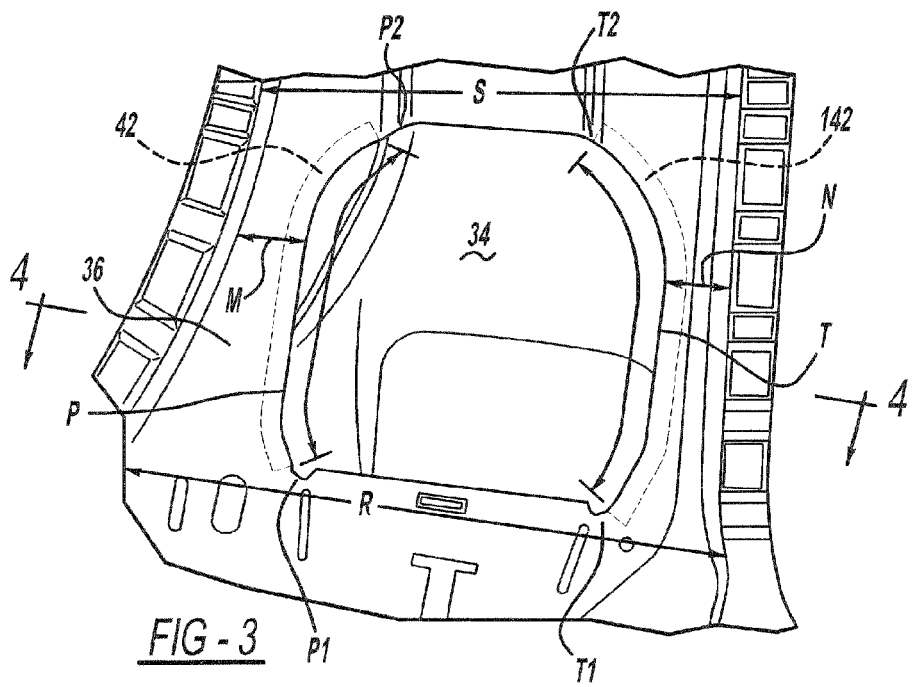
FIG. 3 is a side view of a portion of the vehicle "B" pillar shown in FIG. 1.

As seen in FIG. 3, due to the presence of opening 36a, the cross-sectional area of the inner panel along the opening (in regions "M" and "N") is much less than the cross-sectional areas of portions of the panel adjacent the opening (in regions "R" and "S"). Thus, the resistance of the inner panel to buckling and side-impact loading is relatively lower in this portion of the panel.

As seen from FIGS. 3-6, the flange 42 of the inner panel described above extends along a side P of the edge of opening 36a opposite from the side T along which flange 142 extends. This configuration increases the cross-sectional area of the inner panel 36 in the region of opening 36a. Generally, the flanges 42, 142 will extend along as much of the opening edge as possible (taking into account the projected directions, magnitudes, and distributions of forces acting on the portion of the panel with the opening), in order to provide the desired strengthening of the cross-section.

In the particular embodiment shown in FIG. 3, the flange 42 extends along curved portions of the edge of the opening to locations proximate the vertically lowermost extent (at P1) and uppermost extent (at P2) of the opening along side P. Similarly, the flange 142 extends along curved portions of the edge of the opening to locations proximate the vertically lowermost extent (at T1) and uppermost extent (at T2) of the opening along side T. This arrangement helps ensure that the cross-sectional area of the inner panel 36 is increased in as much of the region of the opening as possible, and that the material of the flanges is arranged so as to maximize resistance of the panel to buckling during a roof crush event.

The flanges may be configured to extend along any desired portion or portions of the edge of the opening to provide the benefits discussed herein, according to the shape of the opening, the calculated directions of the forces to be applied to the pillar, and other requirements of a particular application. In addition, due to the positioning, orientations, and shapes of the flanges 42 and 142, the portion of the inner panel incorporating the opening 36a has greater resistance to buckling and tearing, and also has a greater ability to absorb energy from side impacts than it would in the absence of the flanges.

In an alternative embodiment, rather than attaching inner and outer panels to each other, the pillar into which the flanges 42, 142 are incorporated is formed as a single piece, for example, by extrusion. An opening 36a having a suitable shape for the seatbelt retractor may be produced by piercing, cutting, or other known methods. Edges of the opening 36a can then be formed to produce flanges 42, 142 as described herein.

It will be understood that the foregoing description of an embodiment of the present invention is for illustrative purposes only. As such, the various structural and operational features herein disclosed are susceptible to a number of modifications commensurate with the abilities of one of ordinary skill in the art, none of which departs from the scope of the present invention as defined in the appended claims.

What is claimed is:

1. A panel for a vehicle pillar, the panel comprising:
   a base portion defining an opening; and
   a flange extending from an edge of the opening such that a portion of the flange forms an acute angle with the base portion,
   wherein the flange is structured to deflect toward the base portion responsive to a force applied to the flange in a direction perpendicular to the base portion.

2. A vehicle pillar including a panel in accordance with claim 1.

3. A vehicle body including a panel in accordance with claim 1.

4. A portion of a vehicle body including a panel in accordance with claim 1.

5. A vehicle pillar defining an enclosure therein, the pillar comprising:
   a base portion defining at least a portion of the enclosure; and
   a flange extending from the base portion into the enclosure so as to form an acute angle with the base portion,
   wherein a free end of the flange is positioned such that a force resulting from an impact on the vehicle impinges upon the free end of the flange so as to rotate the free end of the flange toward the base portion.

6. A portion of a vehicle body including a pillar in accordance with claim 5.

7. The vehicle pillar of claim 5 wherein the flange forms an acute angle with a plane extending parallel to a fore-aft axis of the vehicle.

8. The vehicle pillar of claim 5 wherein the pillar further comprises a first panel and a second panel coupled to the first panel, and wherein the base portion is formed by a portion of one of the first and second panels.

9. The vehicle pillar of claim 5 wherein the base portion has an opening formed therein to enable communication between an exterior of the pillar and the enclosure, and wherein the flange extends from an edge of the opening.

10. A vehicle body including a pillar in accordance with claim 5.

11. The panel of claim 1 wherein the angle is about 45 degrees.

12. The vehicle pillar of claim 5 wherein the angle is about 45 degrees.

13. The panel of claim 1 wherein the flange comprises a curved portion extending from the edge of the opening, and another portion extending from the curved portion.

14. The vehicle pillar of claim 5 wherein the flange comprises a curved portion extending from the base portion, and another portion extending from the curved portion.

15. The panel of claim 13 wherein the other portion is substantially straight.

16. The panel of claim 15 wherein the other portion has a length in the range of about 7 millimeters to about 11 millimeters, inclusive.

17. The panel of claim 1 wherein the opening includes at least one edge extending generally vertically and defining the base portion.

18. The panel of claim 1 wherein the flange extends from an edge of the opening along only a portion of the opening.

19. The panel of claim 1 wherein the base portion is straight, wherein the flange comprises a curved portion extending from the edge of the opening and a straight portion extending from the curved portion, and wherein the curved portion has a constant radius of curvature.

20. The panel of claim 13 wherein the curved portion has a radius in the range of about 16 millimeters to about 20 millimeters.

\* \* \* \* \*